United States Patent
Springer et al.

(10) Patent No.: US 10,570,992 B2
(45) Date of Patent: Feb. 25, 2020

(54) COUPLER FOR STRANDED ROPE

(71) Applicant: Southwire Company, LLC, Carrollton, GA (US)

(72) Inventors: Paul Springer, Atlanta, GA (US); Charles L. Holcombe, Newnan, GA (US)

(73) Assignee: Southwire Company, LLC, Carrollton, GA (US)

(*) Notice: Subject to any disclaimer, the term of this patent is extended or adjusted under 35 U.S.C. 154(b) by 500 days.

(21) Appl. No.: 15/299,686

(22) Filed: Oct. 21, 2016

(65) Prior Publication Data

US 2017/0114862 A1    Apr. 27, 2017

Related U.S. Application Data

(60) Provisional application No. 62/244,778, filed on Oct. 22, 2015.

(51) Int. Cl.
*F16G 11/05* (2006.01)
*E21B 17/04* (2006.01)
*F16B 7/02* (2006.01)

(52) U.S. Cl.
CPC .............. *F16G 11/05* (2013.01); *E21B 17/04* (2013.01); *F16B 7/02* (2013.01)

(58) Field of Classification Search
CPC ........ F16G 11/04; F16G 11/05; F16G 11/042; F16G 11/044; F16G 11/046; F16G 11/048; E21B 17/02; E21B 17/023; E21B 17/026; E21B 17/04; Y10T 403/471; Y10T 403/473; Y10T 403/475
See application file for complete search history.

(56) References Cited

U.S. PATENT DOCUMENTS

| | | | | |
|---|---|---|---|---|
| 1,577,003 A | * | 3/1926 | Sunderland | F16G 11/042 24/122.3 |
| 1,832,940 A | * | 11/1931 | Matthes | F16G 11/05 174/84 S |
| 2,803,486 A | * | 8/1957 | Larson | F16G 11/042 294/82.11 |
| 3,829,937 A | * | 8/1974 | Metzler | F16G 11/048 174/79 |
| 4,279,531 A | * | 7/1981 | McKenzie | F16G 11/05 403/267 |

(Continued)

FOREIGN PATENT DOCUMENTS

| | | | | |
|---|---|---|---|---|
| DE | 2 028 875 | * | 12/1970 | ......... Y10T 403/473 |
| FR | 47418 | * | 5/1937 | ............ F16G 11/042 |
| GB | 966173 | * | 8/1964 | ............ F16G 11/042 |

OTHER PUBLICATIONS

Translation of FR 804154. worldwide.espacenet.com. dated Feb. 8, 2019.*

*Primary Examiner* — Michael P Ferguson
(74) *Attorney, Agent, or Firm* — Merchant & Gould P.C.

(57) ABSTRACT

A coupler may be provided. The coupler may comprise a first cylindrical cavity, a first truncated conical cavity, and a second truncated conical cavity. The first truncated conical cavity may be adjacent to and concentric with the first cylindrical cavity. The first truncated conical cavity may have a first angle. The second truncated conical cavity may be adjacent to and concentric with the first truncated conical cavity. The second truncated conical cavity may have a second angle less than the first angle.

17 Claims, 5 Drawing Sheets

(56) References Cited

U.S. PATENT DOCUMENTS

| | | | | |
|---|---|---|---|---|
| 4,317,640 A | * | 3/1982 | Peeling | F16G 11/042 403/268 |
| 2015/0300452 A1 | * | 10/2015 | Campbell | F16G 11/025 403/275 |
| 2018/0051522 A1 | * | 2/2018 | Sjostedt | F16G 11/042 |

* cited by examiner

COUPLER FOR STRANDED ROPE

RELATED APPLICATION

Under provisions of 35 U.S.C. § 119(e), Applicants claim the benefit of U.S. provisional application No. 62/244,778 filed Oct. 22, 2015, which is incorporated herein by reference.

TECHNICAL FIELD

The present disclosure relates generally to a coupler, specifically, to a coupler for stranded rope.

BACKGROUND

A sucker rod is a steel rod, typically between 25 and 30 feet long, and threaded at both ends, used in the oil industry to join together the surface and downhole components of a reciprocating piston pump installed in an oil well. A pumpjack is the visible above-ground (surface unit) drive for the well pump, and is connected to the downhole pump at the bottom of the well by a series of interconnected sucker rods.

The surface unit transfers energy for pumping the well from a prime-mover to a sucker rod string. In doing this, it must change the rotary motion of the prime-mover to a reciprocating motion of the sucker rod. Also, it must reduce the speed of the prime-mover to a suitable pumping speed. Speed reduction is accomplished by a gear reducer. Rotary motion of a crank shaft is converted to an oscillatory motion by a walking beam. A crank arm is connected to the walking beam by a pitman arm. The walking beam is supported by a Samson post and a saddle bearing. A horse head and bridle are used to ensure that the pull on the sucker rod string is vertical all times so that no bearing movement is applied to that part of the sucker rod string above stuffing box. The polished rod and stuffing box combination is used to maintain a good liquid seal at the surface.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Figure 1A:
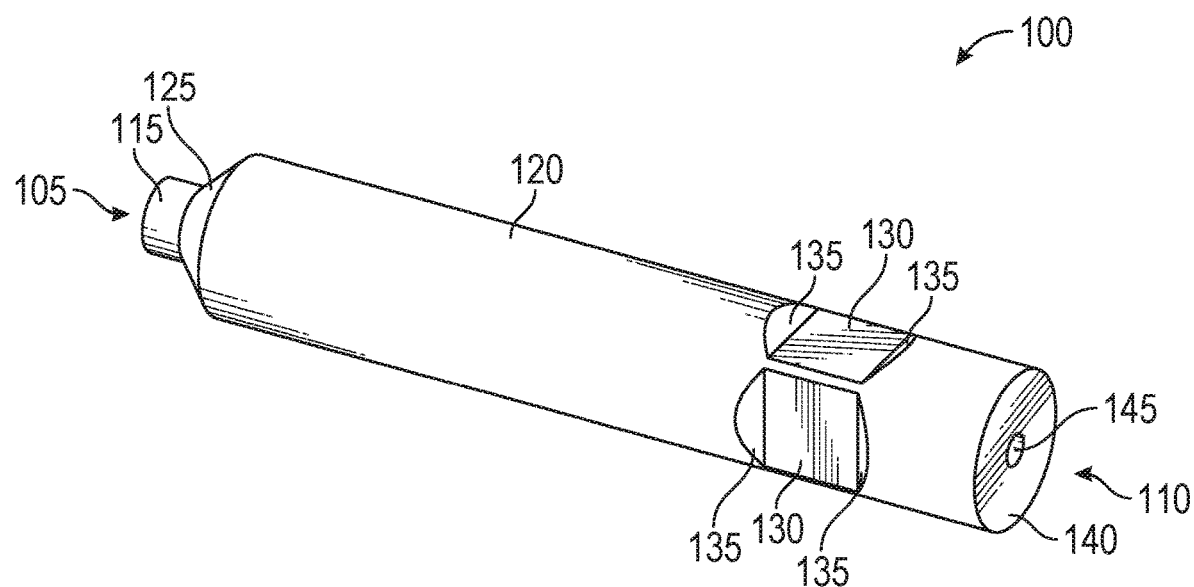
FIGS. 1A and 1B show a coupler.

A coupler may be provided. The coupler may comprise a first cylindrical cavity, a first truncated conical cavity, and a second truncated conical cavity. The first truncated conical cavity may be adjacent to and concentric with the first cylindrical cavity. The first truncated conical cavity may have a first angle. The second truncated conical cavity may be adjacent to and concentric with the first truncated conical cavity. The second truncated conical cavity may have a second angle less than the first angle.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Figure 1B:
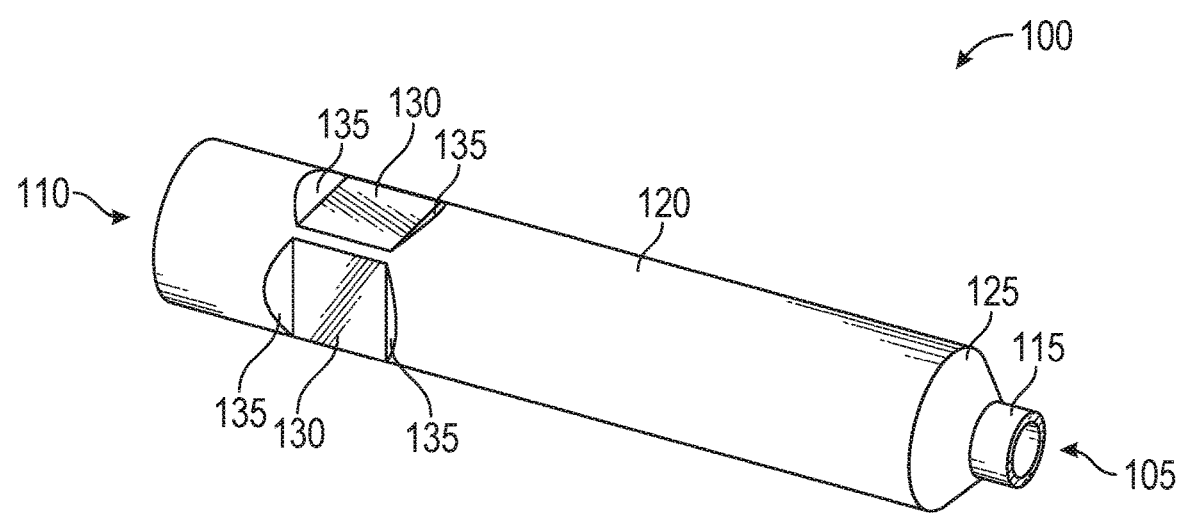

FIGS. 1A and 1B show a coupler 100 consistent with embodiments of the disclosure. Coupler 100, as described in greater detail below, may be used to terminate or splice a rope. As shown in FIGS. 1A and 1B, coupler 100 may comprise a first orifice 105 at one end and a second orifice 110 at the opposite end. First orifice 105 may be configured to receive a rope. Coupler 100 may further comprise a first cylindrical section 115 and a second cylindrical section 120 joined by a truncated conical section 125. Furthermore, coupler 100 may comprise a first plurality of surfaces 130, a second plurality of surfaces 135, and a plug 140.

Figure 2:
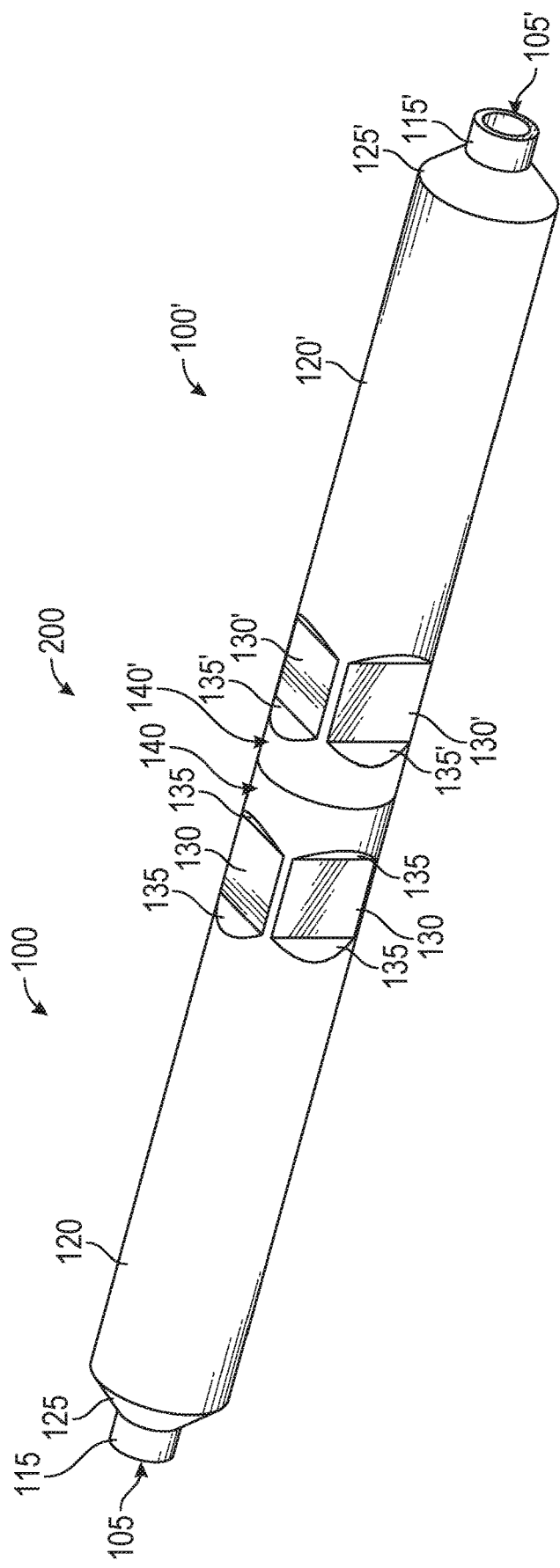
FIG. 2 shows connected couplers.

Plug 140 may comprise a bore 145. Bore 145 may be threaded to mate with a threaded stud. The threaded stud may be used to attach coupler 100 to any element, for example, downhole components of a reciprocating piston pump installed in an oil well, a pumpjack in the visible above-ground portion of an oil well, or another coupler as shown in FIG. 2. As shown in FIG. 2, the stud can thread into both plug 140 and plug 140' in order to connect coupler 100 and coupler 100'. In this way, connected couplers 200 may comprise a splice for a first rope entering first orifice 105 of coupler 100 and a second rope entering first orifice 105' of coupler 100'.

Figure 3A:
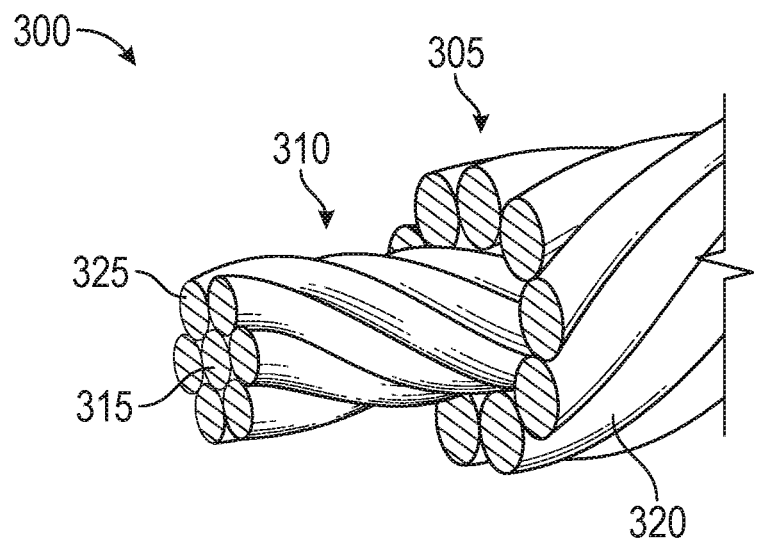
FIGS. 3A and 3B show a stranded rope.
Figure 3B:
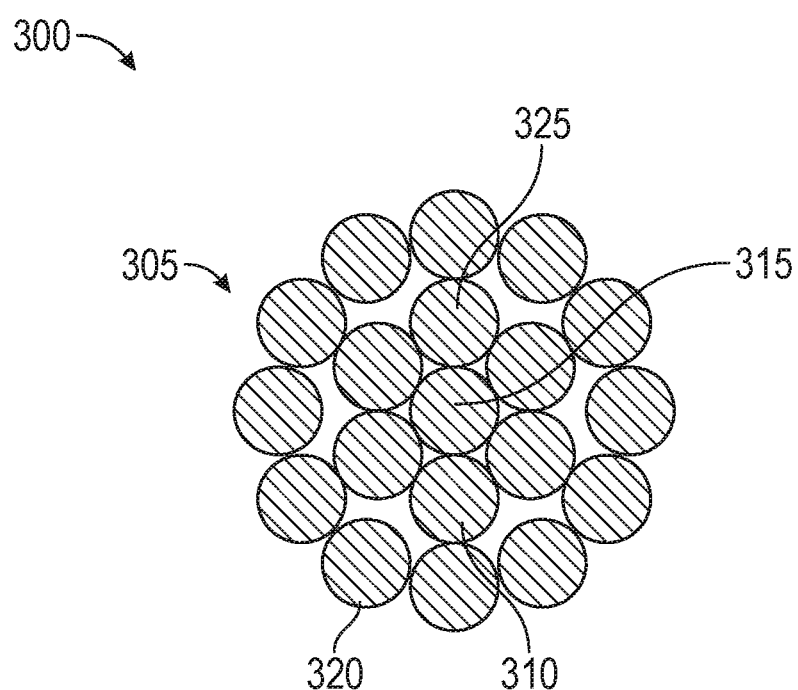

FIGS. 3A and 3B show a stranded rope 300. Stranded rope 300 may comprise a carbon fiber polymer composite rope, a flexible wire rope, stranded steel ropes, or any other type of construction. As shown in FIGS. 3A and 3B, stranded rope 300 may comprise an outer layer 305, an inner layer 310, and a center strand 315. Outer layer 305 may comprise a plurality of outer layer strands 320 and inner layer 310 may comprise a plurality of inner layer strands 325. While FIGS. 3A and 3B show two layers (i.e., outer layer 305 and inner layer 310), stranded rope 300 may comprise any number of layers. Also, while FIGS. 3A and 3B show stranded rope 300 as having 19 strands, stranded rope 300 may comprise any number of strands and is not limited to 19.

Figure 4:
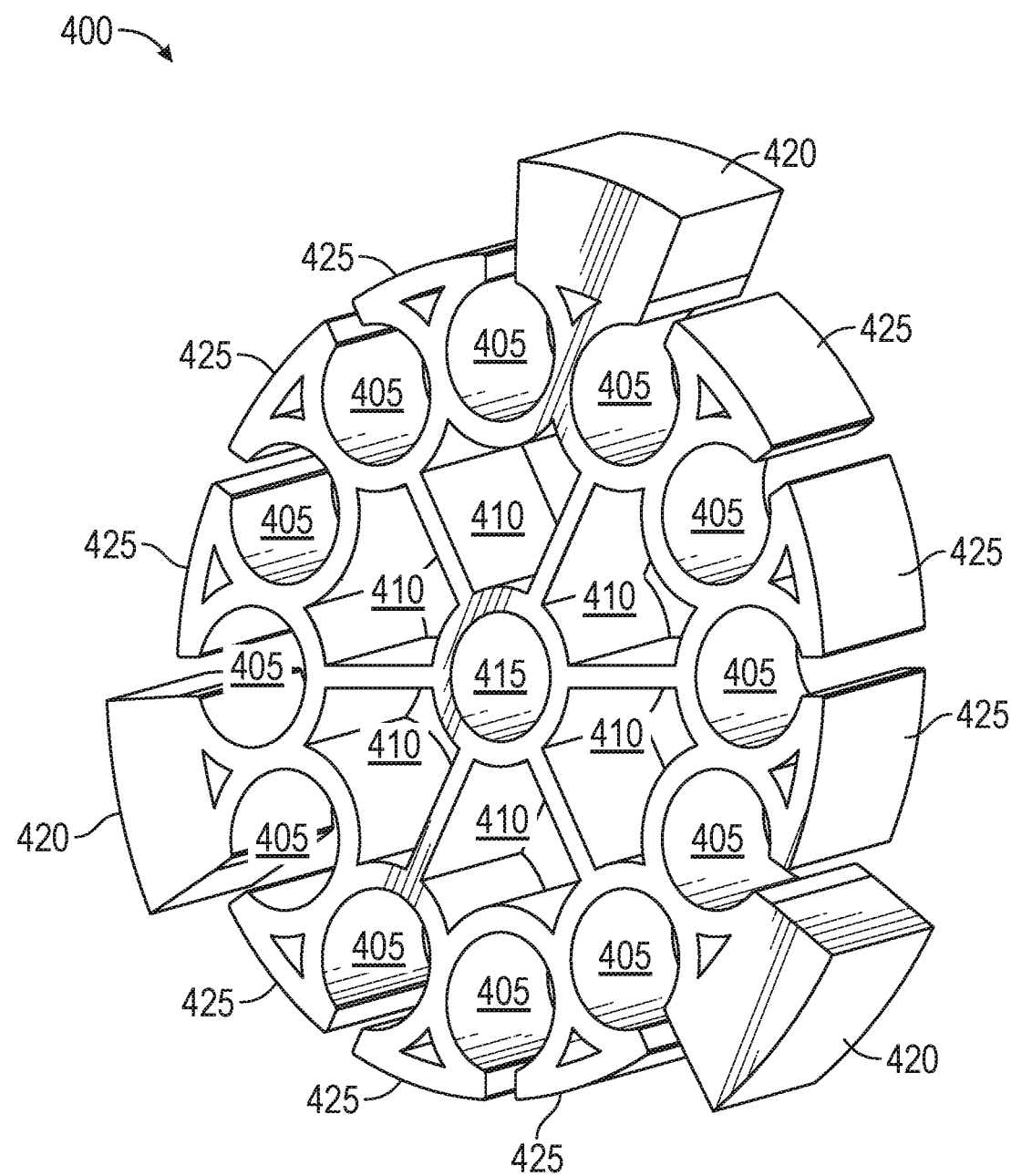
FIG. 4 shows a splay device.

FIG. 4 shows a splay device 400. As shown in FIG. 4, splay device 400 may comprise a plurality of outer openings 405, a plurality of inner openings 410, and a center opening 415. Moreover, splay device 400 may comprise a plurality of outer feet 420 and a plurality of inner feet 425. Splay device 400 may be used inside coupler 100 to splay out the strands (e.g., plurality of outer layer strands 320, plurality of inner layer strands 325, and center strand 315) comprising stranded rope 300. For example, each of plurality of outer openings 405 may respectively correspond to and be configured to respectively receive each of plurality of outer layer strands 320. Similarly, each of plurality of inner openings 410 may respectively correspond to and be configured to respectively receive each of plurality of inner layer strands 325. Center opening 415 may correspond to and be configured to receive center strand 315.

Figure 5:
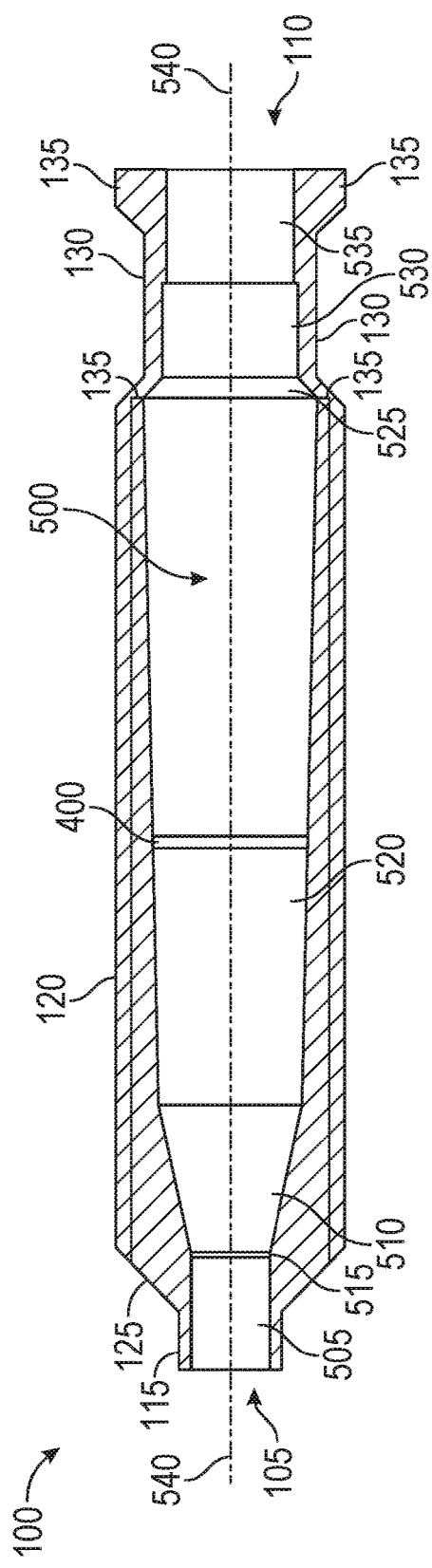
FIG. 5 shows an inner cavity of a coupler.

FIG. 5 shows an inner cavity 500 of coupler 100. As shown in FIG. 5, inner cavity 500 may comprise a first cylindrical cavity 505, a first truncated conical cavity 510, and a first transitional cavity 515 connecting first cylindrical cavity 505 and first truncated conical cavity 510. Inner cavity 500 may further comprise a second truncated conical cavity 520, a second transitional cavity 525, a second cylindrical cavity 530, and a third cylindrical cavity 535. Coupler 100 may be symmetrical to a first axis 540. As shown in FIG. 5, splay device 400 may fit snuggly inside inner cavity 500. Plurality of outer feet 420 may press against a surface of inner cavity 500. First axis 540 may pass substantially through the center of center opening 415. Splay device 400 may be substantially perpendicular to first axis 540 that may pass through a center of first cylindrical cavity 505, first truncated conical cavity 510, first transitional cavity 515, second truncated conical cavity 520, second transitional cavity 525, second cylindrical cavity 530, third cylindrical cavity 535, and plug 140. First cylindrical cavity 505, first truncated conical cavity 510, first transitional cavity 515, second truncated conical cavity 520, second transitional cavity 525, second cylindrical cavity 530, third cylindrical cavity 535, and plug 140 may all be concentric.

Consistent with embodiments of the disclosure, rope 300 may be inserted into first orifice 105, pass through inner cavity 500, and exit coupler 100 through second orifice 110. Splay device 400 may then be placed on rope 300 while rope 300 is outside of coupler 100 on the second orifice 110 end. When placing splay device 400 on rope 300, each of plurality of outer layer strands 320 may be respectively and correspondingly passed through each of plurality of outer openings 405. Similarly, each of plurality of plurality of inner layer strands 325 may be respectively and correspondingly passed through each of plurality of inner openings 410. Center strand 315 may be passed through center opening 415. After splay device 400 has been placed on rope 300, splay device 400 may be installed in inner cavity 500 as shown in FIG. 5. Splay device 400 may fit snuggly inside inner cavity 500. Each of plurality of outer feet 420 may press against and fit snuggly in inner cavity 500. Splay device 400 may be substantially perpendicular to first axis 540. First axis 540 may pass substantially through the center of center opening 415 after splay device 400 has been installed in inner cavity 500.

After splay device 400 has been installed in inner cavity 500, inner cavity 500 may be filled with a resin. For example, coupler 100 may be tipped upward with second orifice 110 at the top. The resin may then be poured into second orifice 110. The resin may fill inner cavity 500 and pass through gaps in splay device 400 and gaps between inner cavity 500 and splay device 400. Splay device 400 may splay out the strands comprising stranded rope 300 (i.e., plurality of outer layer strands 320, plurality of inner layer strands 325, and center strand 315) in inner cavity 500. Because the strands comprising stranded rope 300 may be splayed out in inner cavity 500, the resin may fill in around the strands comprising stranded rope 300. Accordingly, more of the surface area of the strands comprising stranded rope 300 may contact the resin creating a greater bond when the resin sets. Consequently, a tension on stranded rope 300 may be more evenly distributed between the strands comprising stranded rope 300 when stranded rope 300 is pulled by coupler 100, for example.

Consistent with embodiments of the disclosure, after splay device 400 has been placed on rope 300 and splay device 400 has been installed in inner cavity 500, first cylindrical cavity 505 may a line stranded rope 300 in inner cavity 500 substantially with first axis 540 because the surface of first cylindrical cavity 505 may be parallel with first axis 540. Consequently, a tension in the direction of first axis 540 on stranded rope 300 may be evenly distributed between the strands comprising stranded rope 300 when stranded rope 300 is pulled by coupler 100, for example. If stranded rope 300 is not substantially aligned with first axis 540, some strands of stranded rope 300 may be in compression and some strands of stranded rope 300 may be in tension and when a tension in the direction of first axis 540 is applied on stranded rope 300, the strands already in tension may break first.

Figure 6:
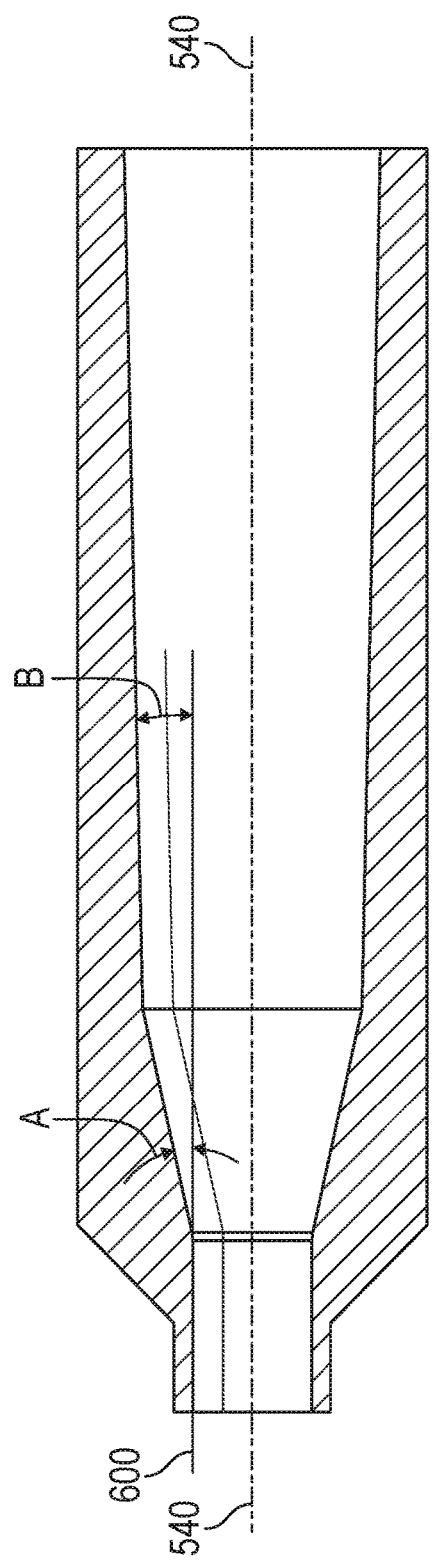
FIG. 6 shows an inner cavity of a coupler in more detail.

Coupler 100 may be machined from billet alloy steel that may be heat-treated for strength to withstand both the tensile and hoop stresses developed as stranded rope 300 (e.g., a carbon fiber polymer composite rope) is subjected to both static and dynamic loads. There may be three (3) distinct regions internal to coupler 100's inner cavity 500. Each may contribute to a successful termination of stranded rope 300. First, first cylindrical cavity 505 may hold stranded rope 300 in alignment to ensure each of the strands comprising stranded rope 300 may be evenly distributed within the bulk of the resin core once poured. Next, first truncated conical cavity 510 may be cut to an angle A (e.g., a first angle) for gripping as shown in FIG. 6. Angle A may comprise, for example, 14 degrees. Second truncated conical cavity 520 may provide sufficient holding strength to ensure the compression on first truncated conical cavity 510 increases to the point that friction hold may develop above the point where adhesion alone would not be sufficient to grip the strands comprising stranded rope 300. Second truncated conical cavity 515 may be cut to an angle B (e.g., a second angle) for gripping as shown in FIG. 6. Angle B may comprise, for example, 1.25 degrees. Angles A and B may be optimized based on the elastic compression modulus of the strands comprising stranded rope 300 and the resin to match with the effective tensile elastic modulus of coupler 100. Angles A and B may be measured relative a second axis 600 as shown in FIG. 6. Angles A and B may be equal, angle A may be greater than angle B, or angle B may be greater than angle A.

Consistent with embodiments of the disclosure, inner cavity 500 may be polished to remove tool marks and lower the sliding resistance of the resin. Inner cavity 500 may be coated with a material (e.g., a polymer, Teflon, etc.) to lower friction. Furthermore, coupler 100's inner cavity 500 may comprise any number of distinct regions having any geometric shape and is not limited to three. For example, inner cavity 500 may comprise a single region, two regions, three or more regions, or may comprise a geometric shaped taper (e.g., parabolic).

Embodiments of the disclosure may provide an environment in which a bond between the resin (i.e. after it has set) and all or a portion of inner cavity 500 may be mitigated. As stated above, all or a portion of inner cavity 500 may be coated with a material (e.g., a polymer, Teflon, etc.) to lower friction. Accordingly, once the resin is poured into inner cavity 500 and is set, the sliding resistance of the set resin against inner cavity 500 may be mitigated. Consequently, while the bonds between the set resin and center strand 315, plurality of outer layer strands 320, and plurality of inner layer strands 325 may be very strong, the bond between the set resin and inner cavity 500 may be very weak. In this way, as a force is place on rope 300 in a direction away from coupler 100 after the resin is set, the set resin may slide against all or a portion of inner cavity 500 and not adhere to all or a portion of inner cavity 500.

Furthermore, all or a portion of inner cavity 500 may be coated with a material that may bond with all or a portion of inner cavity 500 and the set resin to some extent, but may easily facture once a force is place on rope 300 in a direction away from coupler 100 after the resin is set. In this way, as a force is placed on rope 300 in a direction away from coupler 100 after the resin is set, the set resin may slide against all or a portion of inner cavity 500 and not adhere to inner cavity 500. Consequently, while the bonds between the set resin and center strand 315, plurality of outer layer strands 320, and plurality of inner layer strands 325 may be very strong, the bond between the set resin and all or a portion of inner cavity 500 may be very weak.

Moreover, a sheath material may be inserted into all or a portion of inner cavity 500 prior to the resin being placed in all or a portion of inner cavity 500. The sheath material may comprise a sheet rolled into a cylinder and inserted in to inner cavity 500 through second orifice 110. Once the resin is poured into second orifice 110, the sheath material may take the form of all or a portion of inner cavity 500. The sheath material may create a lower sliding resistance between the sheath material and all or a portion of inner cavity 500. In addition or in the alternative, the sheath material may create a lower sliding resistance between the sheath material and the set resin. In this way, as a force is place on rope 300 in a direction away from coupler 100 after the resin is set, the sheath may slide against inner cavity 500 and not adhere to inner cavity 500 and/or the set resin may slide against the sheath material and not adhere to the sheath material.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
a rope coupler having an inner cavity comprising:
a first cylindrical cavity comprising a first orifice;
a first truncated conical cavity adjacent to and concentric with the first cylindrical cavity, the first truncated conical cavity having a first angle; and
a second truncated conical cavity adjacent to and concentric with the first truncated conical cavity, the second truncated conical cavity having a second angle less than the first angle;
a splay device disposed in the second truncated conical cavity, the splay device comprising:
a center opening;
a plurality of ribs radially extending from the center opening and defining a plurality of inner openings therebetween surrounding the center opening;
a plurality of outer openings disposed about the plurality of ribs surrounding the inner openings; and
a plurality of outer feet radially extending from the plurality of outer openings;
a stranded rope disposed in the first orifice;
wherein each of a plurality of outer layer strands of the stranded rope passes through a respective one of the plurality of outer openings, wherein each of a plurality of inner strands of the stranded rope passes through a respective one of the plurality of inner openings, and wherein a center strand of the stranded rope passes through the center opening; and
wherein each of the outer feet press against the second truncated conical cavity such to form a gap between an inner surface of the second cavity and the plurality of outer openings; and
a resin filling the inner cavity of the coupler and encompassing the strands of the rope and the splay device.

2. The apparatus of claim 1, wherein the splay device is substantially perpendicular to an axis passing through a center of the first cylindrical cavity, a center of the first truncated conical cavity, and a center of the second truncated conical cavity.

3. The apparatus of claim 1, further comprising a second transitional cavity adjacent to and concentric with the second truncated conical cavity.

4. The apparatus of claim 3, further comprising a second cylindrical cavity adjacent to and concentric with the second transitional cavity.

5. The apparatus of claim 4, further comprising a third cylindrical cavity adjacent to and concentric the second cylindrical cavity.

6. The apparatus of claim 5, further comprising a plug being concentric to and disposed in the third cylindrical cavity.

7. The apparatus of claim 6, further comprising a bore in the plug, the bore being threaded to mate with a threaded stud.

8. The apparatus of claim 1, wherein the first angle is approximately 14 degrees.

9. The apparatus of claim 1, wherein the second angle is approximately 1.25 degrees.

10. An apparatus comprising:
a splay device comprising:
a center opening;
a plurality of ribs extending radially from the center opening and defining a plurality of inner openings therebetween surrounding the center opening;
a plurality of outer openings disposed about the plurality of ribs surrounding the inner openings; and
a plurality of outer feet radially extending from the plurality of outer openings;
a stranded rope disposed in a first orifice of a first cylindrical cavity of an inner cavity of a rope coupler;
wherein each of a plurality of outer layer strands of the stranded rope passes through a respective one of the plurality of outer openings, wherein each of a plurality of inner layer strands of the stranded rope passes through a respective one of the plurality of inner openings, and wherein a center strands of the stranded rope passes through the center opening; and wherein each of the outer feet press against the inner cavity of the rope coupler such to form a gap between an inner surface of the inner cavity and the plurality of outer openings; and a resin filling the inner cavity of the coupler and encompassing the strands of the rope and the splay device.

11. The apparatus of claim 10, wherein the stranded rope is splayed by the apparatus.

12. An apparatus comprising:
a rope coupler having an inner cavity comprising:
a first cylindrical cavity, the first cylindrical cavity comprising a first orifice;
a first truncated conical cavity adjacent to and concentric with the first cylindrical cavity, the first truncated conical cavity having a first angle; and
a second truncated conical cavity adjacent to and concentric with the first truncated conical cavity, the second truncated conical cavity having a second angle less than the first angle;
a splay device, the stranded rope being splayed by the splay device, the splay device being substantially perpendicular to an axis passing through a center of the first cylindrical cavity, a center of the first truncated conical cavity, and a center of the second truncated conical cavity, the splay device disposed in the second truncated conical cavity, the splay device comprising:
a center opening;
a plurality of ribs radially extending from the center opening and defining a plurality of inner openings therebetween surrounding the center opening;
a plurality of outer openings disposed about the plurality of ribs surrounding the inner openings; and
a plurality of outer feet radially extending from the plurality of outer openings;
a stranded rope disposed in the first orifice;

wherein each of a plurality of outer layer strands of the stranded rope passes through a respective one of the plurality of outer openings, wherein each of a plurality of inner layer strands of the stranded rope passes through a respective one of the plurality of inner openings, and wherein a center strand of the stranded rope passes through the center opening; and wherein each of the outer feet press against the second truncated conical cavity such to form a gap between an inner surface of the second cavity and the plurality of outer openings; and a resin being filling the first cylindrical cavity, the first truncated conical cavity, and the second truncated conical cavity, and encompassing the strands of the rope and the splay device.

13. The apparatus of claim 12, wherein the first angle is approximately 14 degrees and the second angle is approximately 1.25 degrees.

14. The apparatus of claim 12, further comprising a second cylindrical cavity adjacent to and concentric with a second transitional cavity and a third cylindrical cavity adjacent to and concentric the second cylindrical cavity.

15. The apparatus of claim 14, further comprising a plug being concentric to and disposed in the third cylindrical cavity.

16. The apparatus of claim 15, further comprising a bore in the plug, the bore being threaded to mate with a threaded stud.

17. The apparatus of claim 15, further comprising a sheath material inserted into each of the first cylindrical cavity, the first truncated conical cavity, and the second truncated conical cavity, the sheath material inserted prior to the resin being disposed.

* * * * *